(12) United States Patent
Trombetta et al.

(10) Patent No.: US 11,249,623 B2
(45) Date of Patent: Feb. 15, 2022

(54) INTEGRATED INTERFACES FOR DYNAMIC USER EXPERIENCES

(71) Applicants: SONY INTERACTIVE ENTERTAINMENT LLC, San Mateo, CA (US); SONY INTERACTIVE ENTERTAINMENT INC., Tokyo (JP)

(72) Inventors: Steven Trombetta, San Mateo, CA (US); Charles Wayne Denison, II, San Mateo, CA (US); Benedikt Neuenfeldt, Tokyo (JP); Akihiko Kusumoto, Tokyo (JP); Nobukazu Koyama, Tokyo (JP); Atsushi Fuse, Tokyo (JP)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/138,306

(22) Filed: Sep. 21, 2018

(65) Prior Publication Data

US 2020/0097147 A1    Mar. 26, 2020

(51) Int. Cl.
  *G06F 3/0484* (2013.01)
  *A63F 13/20* (2014.01)
  (Continued)

(52) U.S. Cl.
  CPC ............ *G06F 3/0484* (2013.01); *A63F 13/20* (2014.09); *G06F 9/451* (2018.02); *H04L 65/1069* (2013.01)

(58) Field of Classification Search
  CPC .............................. G06F 8/63; G06F 16/2453
  See application file for complete search history.

(56) References Cited

U.S. PATENT DOCUMENTS

| 7,073,187 B1 | 7/2006 | Hendricks et al. |
| 7,614,955 B2 | 11/2009 | Farnham et al. |
| (Continued) | | |

FOREIGN PATENT DOCUMENTS

| WO | WO 2020/060877 | 3/2020 |
| WO | WO 2020/060879 | 3/2020 |
| (Continued) | | |

OTHER PUBLICATIONS

PCT Application No. PCT/US2019/051140 International Search Report and Written Opinion dated Nov. 15, 2019.

(Continued)

*Primary Examiner* — Rayeez R Chowdhury
(74) *Attorney, Agent, or Firm* — Polsinelli LLP

(57) ABSTRACT

A system and method for generating an integrated interface is provided. A user dataset of a user, a peer dataset of a peer user, and interactive titles available to the user are stored in memory. A network interface establishes a session with a user device associated with the first user. A processor executes instructions stored in memory, wherein execution of the instructions by the processor constructs a group of interactive activities based on the sets of one or more activities of each interactive title, a user presence based on the first user dataset, and a peer presence based on the peer dataset and displays the set of interactive activities, the user presence, and the peer presence on an integrated interface displayed on the first user device.

20 Claims, 3 Drawing Sheets

(51) Int. Cl.
　　　*G06F 9/451*　　　(2018.01)
　　　*H04L 29/06*　　　(2006.01)

(56) References Cited

U.S. PATENT DOCUMENTS

| | | | |
|---|---|---|---|
| 7,846,024 B2 | 12/2010 | Graepel et al. | |
| 8,328,610 B2 | 12/2012 | Shimura et al. | |
| 8,425,330 B1 | 4/2013 | Kislyi et al. | |
| 8,727,892 B1 | 5/2014 | Chun | |
| 9,120,020 B2 | 9/2015 | Michel et al. | |
| 9,526,993 B2 | 12/2016 | Rom et al. | |
| 9,610,504 B2 | 4/2017 | Kislyi et al. | |
| 9,656,176 B2 | 5/2017 | Riego | |
| 9,764,240 B2 | 9/2017 | Khan | |
| 9,931,571 B2 | 4/2018 | Cho | |
| 10,130,872 B2 | 11/2018 | Buhr et al. | |
| 10,130,889 B2 | 11/2018 | Riego | |
| 10,343,069 B2 | 7/2019 | Noss | |
| 10,449,458 B2 | 10/2019 | Torres | |
| 10,695,671 B2 | 6/2020 | Trombetta et al. | |
| 10,765,952 B2 | 9/2020 | Trombetta | |
| 10,987,593 B2 | 4/2021 | Trombetta | |
| 2002/0137565 A1* | 9/2002 | Blanco | A63F 13/10 463/46 |
| 2006/0121991 A1* | 6/2006 | Borinik | A63F 13/12 463/43 |
| 2007/0082659 A1 | 4/2007 | Nevalainen | |
| 2007/0087799 A1* | 4/2007 | Van Luchene | A63F 13/792 463/1 |
| 2007/0117635 A1 | 5/2007 | Spanton et al. | |
| 2007/0173325 A1 | 7/2007 | Shaw et al. | |
| 2007/0207860 A1 | 9/2007 | Yamauchi et al. | |
| 2007/0218997 A1 | 9/2007 | Cho | |
| 2008/0242420 A1 | 10/2008 | Graepel et al. | |
| 2009/0042646 A1* | 2/2009 | Sarkar | H04L 67/38 463/29 |
| 2009/0104956 A1 | 4/2009 | Kay et al. | |
| 2009/0111576 A1 | 4/2009 | Ostergren et al. | |
| 2009/0325711 A1 | 12/2009 | Bronstein et al. | |
| 2009/0325712 A1 | 12/2009 | Rance | |
| 2011/0177863 A1 | 7/2011 | Davidsion et al. | |
| 2012/0142429 A1 | 6/2012 | Muller | |
| 2012/0166994 A1* | 6/2012 | Aonuma | G06F 11/3055 715/772 |
| 2012/0210355 A1* | 8/2012 | Kim | H04N 21/4788 725/38 |
| 2012/0311041 A1* | 12/2012 | Aonuma | H04L 67/24 709/204 |
| 2012/0322560 A1* | 12/2012 | Joo | A63F 13/35 463/42 |
| 2013/0007013 A1 | 1/2013 | Geisner et al. | |
| 2013/0260896 A1* | 10/2013 | Miura | A63F 13/86 463/42 |
| 2013/0310181 A1 | 11/2013 | Kislyi et al. | |
| 2014/0274402 A1 | 9/2014 | Michel et al. | |
| 2015/0038233 A1 | 2/2015 | Rom et al. | |
| 2015/0127731 A1* | 5/2015 | Hamada | H04L 29/08 709/204 |
| 2016/0001183 A1* | 1/2016 | Harvey | A63F 13/798 463/4 |
| 2016/0082355 A1* | 3/2016 | Kobayashi | H04L 67/24 463/29 |
| 2016/0346701 A1* | 12/2016 | George | A63F 13/00 |
| 2017/0182423 A1 | 6/2017 | Leppinen et al. | |
| 2017/0291109 A1 | 10/2017 | Jensen | |
| 2018/0102029 A1 | 4/2018 | Leslie et al. | |
| 2018/0193741 A1* | 7/2018 | Kiwada | A63F 13/795 |
| 2018/0250591 A1 | 9/2018 | Prado Rojas et al. | |
| 2018/0290060 A1 | 10/2018 | Noss | |
| 2019/0262717 A1 | 8/2019 | Thielbar | |
| 2019/0266845 A1 | 8/2019 | Trombetta et al. | |
| 2019/0282907 A1 | 9/2019 | Jensen | |
| 2020/0086217 A1 | 3/2020 | Trombetta et al. | |
| 2020/0094148 A1 | 3/2020 | Trombetta et al. | |
| 2020/0101377 A1 | 4/2020 | Trombetta et al. | |
| 2020/0213321 A1* | 7/2020 | Herman | H04L 51/32 |
| 2020/0330863 A1 | 10/2020 | Trombetta | |
| 2021/0245059 A1 | 8/2021 | Trombetta | |

FOREIGN PATENT DOCUMENTS

| | | |
|---|---|---|
| WO | WO 2020/060880 | 3/2020 |
| WO | WO 2020/068462 | 4/2020 |

OTHER PUBLICATIONS

PCT Application No. PCT/US2019/051146 International Search Report and Written Opinion dated Nov. 18, 2019.
PCT Application No. PCT/US2019/051157 International Search Report and Written Opinion dated Oct. 16, 2019.
PCT Application No. PCT/US2019/051150 International Search Report and Written Opinion dated Nov. 4, 2019.
U.S. Appl. No. 16/1137,953 Office Action dated Nov. 27, 2019.
U.S. Appl. No. 16/146,645 Office Action dated Sep. 20, 2019.
PCT/US19/51140, Dynamic Interfaces for Launching Direct Gameplay, Sep. 13, 2019.
PCT/US19/51146, Integrated Interfaces for Dynamic User Experiences, Sep. 13, 2019.
PCT/US19/51150, System-Level Multiplayer Matchmaking, Sep. 13, 2019.
PCT/US19/51157, Establishing and Managing Multiplayer Sessions, Sep. 13, 2019.
U.S. Appl. No. 16/135,273 Final Office Action dated Oct. 9, 2020.
U.S. Appl. No. 16/135,273 Office Action dated Jan. 17, 2020.
U.S. Appl. No. 17/241,829, Steven Trombetta, Dynamic Interfaces for Launching Direct Gameplay, Apr. 27, 2021.
U.S. Appl. No. 16/917,465 Office Action dated Aug. 17, 2021.
PCT Application No. PCT/US2019/051140 International Preliminary Report on Patentability dated Mar. 23, 2021.
PCT Application No. PCT/US2019/051146 International Preliminary Report on Patentability dated Mar. 23, 2021.
PCT Application No. PCT/US2019/051157 International Preliminary Report on Patentability dated Mar. 23, 2021.
PCT Application No. PCT/US2019/051150 International Preliminary Report on Patentability dated Mar. 23, 2021.

\* cited by examiner

INTEGRATED INTERFACES FOR DYNAMIC USER EXPERIENCES

BACKGROUND

1. Field of the Invention

The present technology pertains to providing dynamic user experiences. More specifically, the present technology may generate integrated interfaces for dynamic user experiences.

2. Description of the Related Art

User interfaces for platform-based gameplay (e.g., Sony PlayStation®) may include a variety of different user interfaces used to select content (e.g., a game) to play, interact with other users, or otherwise interact with the selected content or other content in different ways. The user interfaces used in digital games may also display information about the user, peers, and gameplay by the users and/or peers. Presently available user interfaces for displaying the user gameplay data may include displaying a string text and/or a specific achievement (e.g., a trophy) provided by each game for each user. Such string text may be displayed within each game and may not be viewable outside of the game.

Due to its usage in numerous aspects of digital content interaction, user interfaces can have significant impact on user experience. Such interfaces may, for example, detract from the user experience when gameplay information and statistics are not displayed or poorly displayed. Further, such interfaces may detract from the user experience when peer information and availability of peer interaction is not displayed or only displayed within each game.

There is, therefore, a need in the art for systems and methods for generating integrated interfaces for dynamic user experiences.

SUMMARY OF THE PRESENTLY CLAIMED INVENTION

Embodiments of the present invention include systems and methods for integrated interfaces. Data regarding a user, at least one peer, and at least one interactive title available to the user may be stored in memory. The at least one interactive title may include a set of one or more activities that the user can interactive with. A session may be established with a user device associated with the user. A plurality of interactive activities may be constructed based on the data regarding the user, the at least one peer, and the set of activities included in the at least one interactive title available to the user. Such interactive activities may be associated with a presence of the user and a presence of the at least one peer. An integrated interface may be generated based on the constructed plurality of interactive activities, the presence of the user, and the presence of the at least one peer.

Various embodiments may include methods for generating an integrated interface. Such methods may include retrieving stored data regarding a user, at least one peer, and at least one interactive title available to the user. The at least one interactive title may include a set of one or more activities. Such methods may include establishing a session with a user device associated with the user. Such methods may include constructing a plurality of interactive activities based on retrieved data regarding the user, the at least one peer, and the set of activities included in the at least one interactive title available to the user. Each interactive activity may be associated with a presence of the first user and a presence of the at least one peer. Such methods may include generating an integrated interface based on the constructed plurality of interactive activities, the presence of the user, and the presence of the peer. The generated integrated interface may be displayed on the user device.

Additional embodiments may include systems for generating an integrated interface. Such systems may include memory that stores data regarding a user, at least one peer, and at least one interactive title available to the user. The at least one interactive title may include a set of one or more activities. Such systems may include a network interface that establishes a session with a user device associated with the user over a communication network. Such systems may include a processor that executes instructions stored in memory. Execution of the instructions by the processor may construct a plurality of interactive activities based on retrieved data regarding the user, the at least one peer, and the set of activities included in the at least one interactive title available to the user. Each interactive activity may be associated with a presence of the first user and a presence of the at least one peer. Execution of the instructions by the processor may generate an integrated interface based on the constructed plurality of interactive activities, the presence of the user, and the presence of the peer. The generated integrated interface may be displayed on the user device Further embodiments include non-transitory computer-readable storage media having embodied thereon a program executable by a processor to generate an integrated interface.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for generating an integrated interface that displays a group of available activities associated with interactive content titles, a user presence, and a peer presence on a user device. Such an integrated interface presents multiple options for participating in an activity, or viewing or interacting with a peer (e.g., based on peer presence information). User history and peer history may also be displayed on the integrated interface, thereby presenting the user with past activities in which the user or peer has previously participated. Such histories can therefore provide additional options by which the user can newly participate in a previous activity of an interactive content title or be reminded to try participating in a different activity associated with the same interactive content title. Further, peer history provides an opportunity for the user to discover a new interactive content title, as the user may view a peer history of activities within an interactive content title to which the user does not currently or previously have access or interaction. The integrated interface provides a rich user experience by identifying and presenting multiple options for the user to interact with peers, new or old interactive content titles, and opportunities for multi-user interactions.

Figure 1:
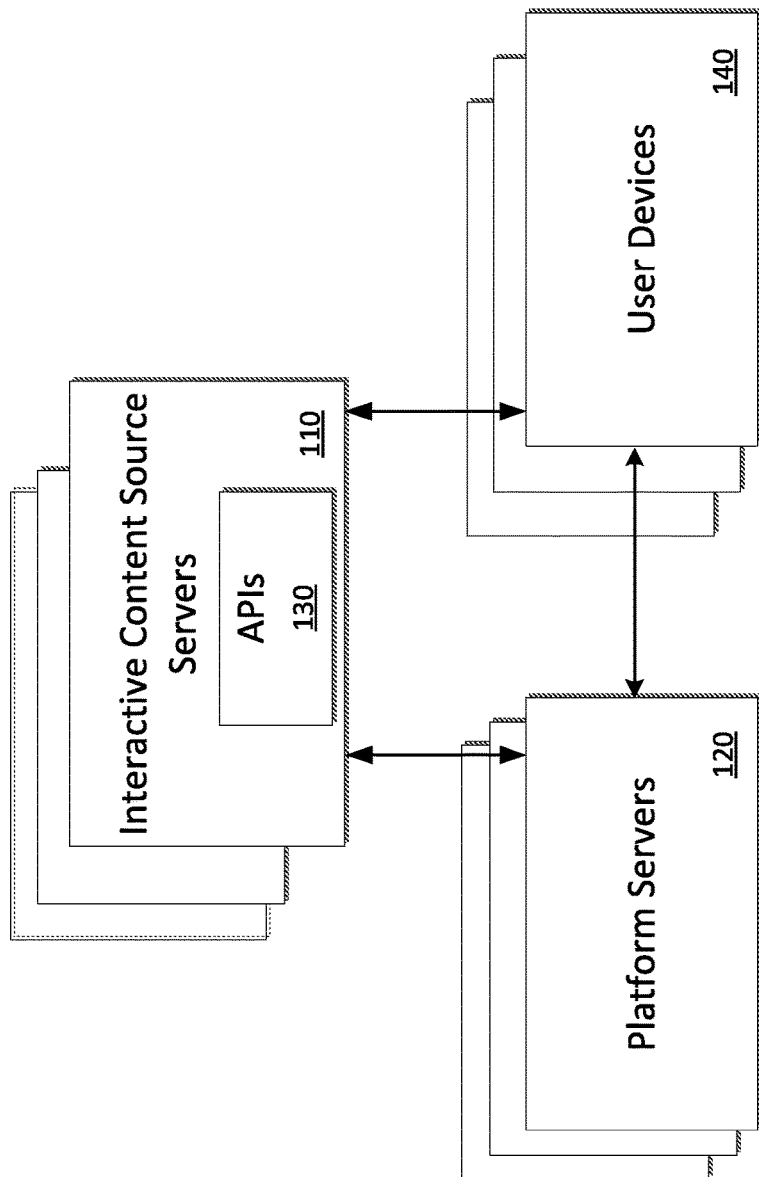
FIG. 1 illustrates a network environment in which a system for generating an integrated interface may be implemented.

FIG. 1 illustrates a network environment 100 in which a system for generating an integrated interface may be implemented. The network environment 100 may include one or more interactive content source servers 110 that provide interactive content (e.g., video games, interactive video, etc.), platform servers 120, and one or more user devices 140.

Interactive content source servers 110 may maintain and host interactive content titles available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. In one example, the interactive content title is a video game title having different modes of competitive gameplay available within that game title. In another example, the interactive content title is another video game title having an interactive storyline for single user play. The interactive content source servers 110 may also provide user data pertaining to a hosted interactive title. For example, the user data may include a current status of the user within an interactive title and current and historical statistics related to the user and/or user interaction with one or more interactive titles.

The platform servers 120 may be responsible for communicating with the different interactive content source servers 110 in order to retrieve activity data of one or more activities available within each content title, user data, and/or peer (e.g., one or more other users) data to the user device 140. Such platform servers 120 may be implemented on one or more cloud servers. Peer data may be stored in memory on a corresponding platform server 120 and/or interactive content source servers 110. The platform server 120 may carry out instructions, for example, for constructing a set of activities available to the user based on the activity data, a user presence based on the user data, and/or a peer presence based on the peer data on user device 140. The user presence and peer presence may be updated in real-time, for example, as the user progresses through an interactive title and the peer progresses through another interactive title. As such, the set of activities, user presence, and peer presence can be different each time the user accesses the user device 140. The platform servers 120 may also carry out further instructions, for example, for tracking and displaying user progress within an interactive content title (e.g., progress of an activity, competitive match, gameplay, storyline, etc.) and/or up-to-date information or progress of a peer within the same or a different interactive title. The platform server 120 may also generate a user interface to be displayed on a specific user device 140 by which the user can view and select activities, interactive content, user data, user history, peer data, peer history, or the like.

The interactive content titles and their corresponding activities may be provided through an application programming interface (API) 130, which allows various types of interactive content sources server 110 to communicate with different platform servers 120 and different user devices 140. API 130 may be specific to the particular computer programming language, operating system, protocols, etc., of the interactive content source servers 110 providing the interactive content titles and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 3.

Figure 2:
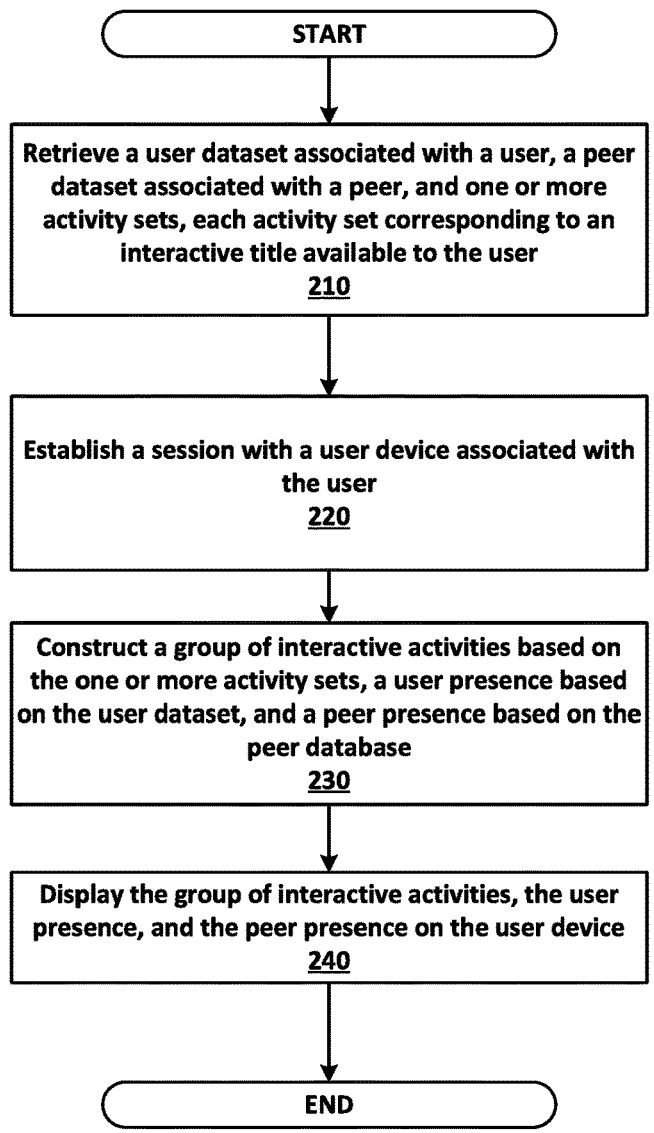
FIG. 2 is a flowchart illustrating an exemplary method for generating an integrated interface.

FIG. 2 is a flowchart illustrating an exemplary method 200 for generating an integrated interface. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 2 are performed in the cloud). The steps identified in FIG. 2 (and the order thereof) are exemplary and may include various alternatives, equivalents, or derivations thereof including but not limited to the order of execution of the same.

In step 210, a user dataset associated with a user, a peer dataset associated with one or more peers, and one or more activity sets are retrieved by, for example, the platform server 120. The user dataset, the peer dataset, and the one or more activity sets may be stored in memory on the interactive content source servers 110 or the platform servers 120.

The user dataset may include data related to a past activity completed (e.g., a completed competitive match, a completed task or quest, etc.) by the user. Such past activity may be re-playable by the user, as discussed below. The user dataset may also include content captured during the past activity (e.g., video, broadcast, screenshots, etc.). The user dataset may also include data related to an in-progress user session, where the user is currently participating in an activity. The user session can be paused and resumed at a later time. Such in-progress data may be continuously retrieved by the platform server 120 as the progress data is updated. The user dataset may also include data and statistics related to the in-progress user session (e.g., time elapsed since start of the activity, percentage of activity completed, progress efficiency, team members in competitive activity, etc.) or to a past activity (e.g., total time to complete activity, result of competitive activity, etc.).

The peer may be any other user in the interactive network, including designated friends, team members, celebrities, and other individuals. The peer dataset may include data related to a past activity (e.g., a completed competitive match, a completed task or quest, etc.) by the peer. Such past activity may be viewable and/or playable by the user. The peer dataset may also include content captured during the past activity (e.g., video, broadcast, screenshots, etc.). The peer dataset may also include data related to an in-progress peer session, where the peer is currently participating in an activity. Such in-progress data may be continuously retrieved by the platform server 120 as the progress data is updated. The peer dataset may also include data and statistics related to the in-progress peer session (e.g., time elapsed since start of the activity, percentage of activity completed, progress efficiency, team members in competitive activity, etc.) or related to a past activity (e.g., total time to complete activity, result of competitive activity, etc.).

In step 220, a session is established between a user device 140 associated with the user and the platform server 120. The session enables the platform server 120 to communicate to and from the user device 140.

In step 230, the retrieved data may be used to construct user-specific (and peer-specific) components for an integrated interface. For example, a group of interactive activities based on the one or more activity sets, a user presence based on the user dataset, and a peer presence based on the peer dataset may be constructed by the platform server 120. The user presence may include a current status of the user. Such user current status may be constructed from the data related to the in-progress user session, which may be updated in real-time as the data may be retrieved continuously from the interactive content source servers 110. A user history may also be constructed by the platform server 120. Such user history may be constructed from the data and statistics related to the retrieved past activity data regarding the user. Such history may further combine both the user and peer histories, including data regarding head-to-head competitions, team activities, and other items in common.

The peer presence may include a current status of the peer. Such peer current status may be constructed from the data related to the in-progress peer session, which may be updated in real-time as the data may be retrieved continuously from the interactive content source servers 110. The peer current status may also include whether the peer is available to chat or interactive with directly by the user. A peer history may also be constructed by the platform server 120. Such peer history may be constructed from data and statistics related to past activity or activities of the peer.

In step 240, the interface components—e.g., group of interactive activities, the user presence, and the peer presence—may be configured and displayed on the user device 140 in an integrated interface. The group of interactive activities displayed may be available to currently interact with by the user or in the future (e.g., at a predetermined time). The user may also save an activity for future interaction. The user may also invite a peer to currently join the user in an activity or to join the user in the activity at a later time. For example, the user can send an invitation to five peers who are online to join the user in a competitive match requiring six total users. The invite sends a request to the platform servers 120 to transmit an invitation from the user to the peer. After receiving such request, the platform servers 120 may retrieve data from a past activity (e.g., participants, the interactive title associated with the past activity, configuration of content, match type, match field, etc.) selected by the user. Such data from a past activity, a current activity, or a future activity may be used to create invitations for a current activity or a future activity based on the retrieved data. Such invitation is generated by the platform server 120 of the user and includes a link to the activity. Such invitation may be edited by the user prior to transmission of the invitation to the peer. The invitation is then transmitted from the user platform server 120 to the peer platform server 120 over a communication network. Similarly, the user can receive an invitation from the peer to join the peer in an activity chosen by the peer.

The user presence may be displayed on a peer device and may indicate to a peer whether the user is available to interact with (e.g. voice chat, direct message, etc.) or whether the user is in a user session and participating in an activity of an interactive content title available to the user. The user presence may also display whether the user is interacting with other users within the user session. For example, if the user is participating in a competitive match with three additional users against a team of four other users, the user presence may display the additional users that the user is participating in the competitive match with on the integrated interface. The user may choose to hide user presence from appearing on a peer device. For example, the user may choose to appear offline even when the user is online The peer presence may be displayed on the user device and may indicate to the user whether the peer is available to directly interact with by the user (e.g. voice chat, direct message, etc.) or whether the peer is in a peer session and participating in an activity of an interactive content title available to the peer. If the activity includes multi-user interactions, the user may join the peer session and interact with the peer within the activity or view the interaction of the peer in the activity. If the activity is a single-user activity, the user may join the peer session to view the interaction of the peer in the activity. Furthermore, if the interactive content title is not available to the user because the user has not yet obtained access to the interactive content title (e.g., purchased), the user may be able to view a portion of the peer participation in the activity or the user may be able to participate in an excerpt of the activity (e.g., a demo), thereby incentivizing the user to obtain access to the interactive content title. Peer presences of multiple peers of the user may be displayed, such that the user can view which peers are online or otherwise available to interact with, what activity each peer is participating in if the peer is participating in an activity, and whether the activity each peer is participating in is joinable by the user. Such presence data may provide opportunities for the user to interactive with one or more peers (e.g., friends). In some embodiments, visual indicators may be used to illustrate which peers are or are likely to be available, for how long, and for which activities.

The user history and the peer history may also be displayed on the user device 140. Illustrative content regarding the user history and/or the peer history (e.g., video, broadcast, screenshots, etc.) may be viewable by the user or the peer. Such content may be stored at the platform server 120. The content may also link to a portion of the activity stored at the interactive content source server 110. Such link may allow the user to view the content directly in the interactive content title.

The past activity of the user history displayed on the user device 140 may be available for re-interaction with by the user, thereby incentivizing the user to continue interacting with the interactive title associated with the past activity. The user history may also display the statistics of the past activity. The user history may also display an amount of completion of an interactive content title completed by the user. For example, if the user has completed half of an interactive content title (e.g., completed half of the activities available in the interactive content title), "50% completed" may be displayed by a visual of the interactive content title. Such overall progress may incentivize the user to continue interacting with the interactive title to finish or complete all activities associated with the interactive content title. Further, even if the user has completed activities associated with a main storyline of an interactive content title, the user may not have completed all side activities (e.g., side quests). A progress display may show that the user has completed 90% of the interactive content title and as such, may incentivize the user to continue interacting with the interactive content title until all activities are completed.

The past activity of the peer history may also be displayed on the user device. The user may be able to view statistics related to the peer's past activity, or play the past activity if the interactive content title associated with the peer's past activity is available to the user. Such peer history may provide information to the user such that the user can determine if the user wishes to interact with the peer. For example, the user may decide to interact with the peer because the peer history indicates that the peer and the user interact with the same or similar interactive content titles. If the interactive content title associated with the peer's past activity is not available to the user, the user may view an excerpt of the peer participation stored with the peer's past activity or may play an excerpt of the peer's past activity, thereby incentivizing the user to obtain access to the interactive content title associated with the peer's past activity.

As described, a mixture of currently available activities for a user to interactive with, user history, peer presence, and peer history may be displayed on an integrated interface, providing the user with multiple options and opportunities to interact with new and/or old interactive content titles and/or with peers of the user. The specific configuration of the different components (e.g., activities) within the integrated interface may be based on predetermined preferences, priorities, and conditions specified by the user. Such interface provides opportunities for the user to directly interact with multiple peers and presents available multi-user experiences to the user. The user may also view peer history and peer presence to determine if the user wants to interact with a particular peer directly or join the peer in a user or peer session. Further, such interface allows the user to send an invitation to one or more peers to join the user in participating in an activity and interacting with an interactive content title.

Figure 3:
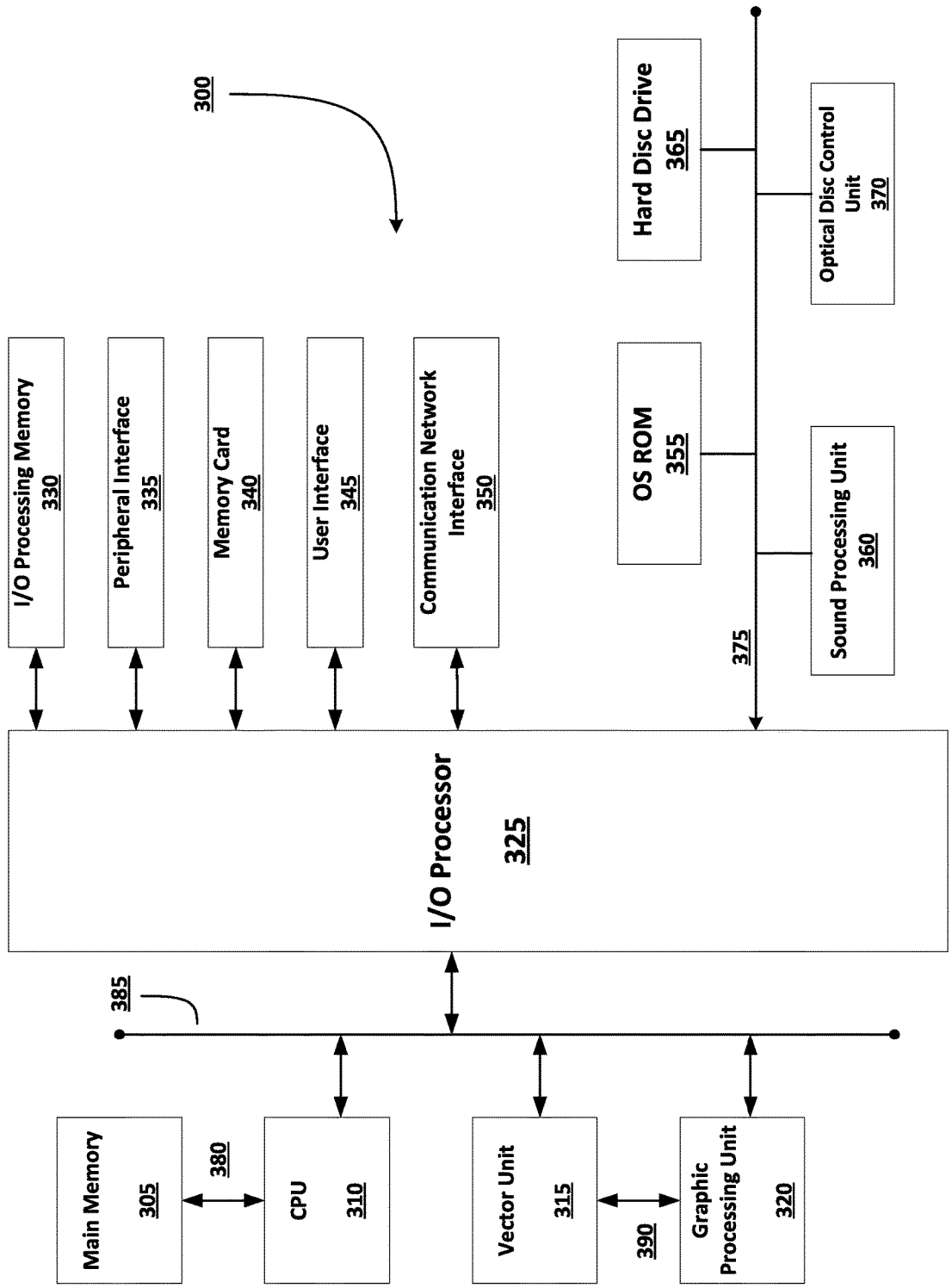
FIG. 3 is an exemplary electronic entertainment system that may be used in generating an integrated interface.

FIG. 3 is an exemplary user electronic entertainment system that may be used in launching interactive content and providing dynamic interfaces. The entertainment system 300 of FIG. 3 includes a main memory 305, a central processing unit (CPU) 310, vector unit 315, a graphics processing unit 320, an input/output (I/O) processor 325, an I/O processor memory 330, a peripheral interface 335, a memory card 340, a Universal Serial Bus (USB) interface 345, and a communication network interface 350. The entertainment system 300 further includes an operating system read-only memory (OS ROM) 355, a sound processing unit 360, an optical disc control unit 370, and a hard disc drive 365, which are connected via a bus 375 to the I/O processor 325.

Entertainment system 300 may be an electronic game console. Alternatively, the entertainment system 300 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 310, the vector unit 315, the graphics processing unit 320, and the I/O processor 325 of FIG. 3 communicate via a system bus 385. Further, the CPU 310 of FIG. 3 communicates with the main memory 305 via a dedicated bus 380, while the vector unit 315 and the graphics processing unit 320 may communicate through a dedicated bus 390. The CPU 310 of FIG. 3 executes programs stored in the OS ROM 355 and the main memory 305. The main memory 305 of FIG. 3 may contain pre-stored programs and programs transferred through the I/O Processor 325 from a CD-ROM, DVD-ROM, or other optical disc (not shown) using the optical disc control unit 370. I/O Processor 325 of FIG. 3 may also allow for the introduction of content transferred over a wireless or other communications network (e.g., 3G, LTE, 1G, and so forth). The I/O processor 325 of FIG. 3 primarily controls data exchanges between the various devices of the entertainment system 300 including the CPU 310, the vector unit 315, the graphics processing unit 320, and the peripheral interface 335.

The graphics processing unit 320 of FIG. 3 executes graphics instructions received from the CPU 310 and the vector unit 315 to produce images for display on a display device (not shown). For example, the vector unit 315 of FIG. 3 may transform objects from three-dimensional coordinates to two-dimensional coordinates, and send the two-dimensional coordinates to the graphics processing unit 320. Furthermore, the sound processing unit 360 executes instructions to produce sound signals that are outputted to an audio device such as speakers (not shown). Other devices may be connected to the entertainment system 300 via the USB interface 335, and the communication network interface 350 such as wireless transceivers, which may also be embedded in the system 300 or as a part of some other component such as a processor.

A user of the entertainment system 300 of FIG. 3 provides instructions via the peripheral interface 335 to the CPU 310, which allows for use of a variety of different available peripheral devices (e.g., controllers) known in the art. For example, the user may instruct the CPU 310 to store certain game information on the memory card 330 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for generating a graphical interface, the method comprising:
   retrieving stored data regarding a user, a current presence of at least one peer, and historical data of two or more completed sessions of two or more interactive activities of each of two or more interactive titles completed by and available to the user and to the at least one peer;
   establishing a session with a user device associated with the user;
   constructing a set of interactive activities for the user and the at least one peer based on the historical data of the retrieved data, wherein the constructed set of interactive activities is associated with the current presence of the at least one peer; and
   generating a graphical interface that includes user-specific components and peer-specific components based on the constructed set of interactive activities, the generated graphical interface being provided for display on the user device, wherein the interactive activities in the constructed set are launchable from the graphical interface upon selection at the user device.

2. The method of claim 1, wherein two or more of the interactive activities in the constructed set are associated with an in-progress session of the at least one peer.

3. The method of claim 1, wherein two or more of the interactive activities in the constructed set are associated with an interactive title that is not available to the user, wherein launching the two or more interactive activities permits the user to participate in an excerpt of the associated interactive title.

4. The method of claim 1, wherein the graphical interface further includes one or more completed single-player interactive activities that are launchable for replay by the user.

5. The method of claim 1, further comprising displaying a peer history on the graphical interface.

6. The method of claim 2, wherein the at least one peer currently participates in one of the interactive activities in the constructed set within the in-progress session.

7. The method of claim 2, wherein the graphical interface further indicates a current status constructed from the retrieved data.

8. The method of claim 6, wherein the at least one peer is currently participating in one of the interactive activities in the constructed set, further comprising receiving a selection from the user device regarding the interactive activity in which the at least one peer is currently participating, and launching the selected activity for the user device, wherein the user joins the at least one peer in participating in the interactive activity within the in-progress session.

9. The method of claim 6, wherein the at least one peer is currently participating in one of the interactive activities in the constructed set, further comprising receiving a selection from the user device regarding the interactive activity in which the at least one peer is currently participating, and launching the selected activity for the user device, wherein the user enters the in-progress session as a viewer.

10. The method of claim 3, wherein the user enters a different session than a peer of the at least one peer, and wherein the different session is associated with the excerpt.

11. The method of claim 1, wherein one of the two or more interactive activities in the constructed set requires multiple users to participate.

12. The method of claim 11, further comprising:
   receiving a request from the user to transmit an invitation to the at least one peer to participate in a selected one of the interactive activities in the constructed set, the selected activity requiring multiple users, wherein the associated interactive title is available to the user and the at least one peer;
   generating the invitation, the invitation linking to the selected activity; and
   transmitting the invitation to the at least one peer.

13. A system for generating a graphical interface, the system comprising:
   memory that stores data regarding a user, a current presence of at least one peer, and historical data of two or more past completed sessions of two or more interactive activities of each of two or more interactive titles completed by and available to the user and to the at least one peer;
   a network interface that establishes a session with a user device associated with the user over a communication network; and
   a processor that executes instructions stored in memory, wherein execution of the instructions by the processor:
      retrieves the stored data;
      constructs a set of interactive activities for the user and the at least one peer based on the historical data of the retrieved data, the constructed set of interactive activities is associated with the current presence of the at least one peer; and
      generates a graphical interface that includes user-specific components and peer-specific components based on the constructed set of interactive activities, the generated graphical interface being provided for display on the user device, wherein the constructed set of interactive activities are launchable from the graphical interface upon selection at the user device.

14. The system of claim 13, wherein at least one of the interactive activities in the constructed set is associated with an in-progress session of the at least one peer.

15. The system of claim 13, wherein at least one of the interactive activities in the constructed set is associated with an interactive title that is not available to the user, wherein launching the at least one interactive activity permits the user to participate in an excerpt of the associated interactive title.

16. The system of claim 13, wherein the graphical interface further includes one or more completed single-player interactive activities that are launchable for replay by the user.

17. The system of claim 13, wherein the graphical interface further displays a peer history on the graphical interface.

18. The system of claim 13, wherein one of the set of interactive activities requires multiple users to participate.

19. The system of claim 13, wherein the network interface further:
receives a request from the user to transmit an invitation to the at least one peer to participate in a selected one of the interactive activities in the constructed set, the selected activity requiring multiple users, wherein the interactive title is available to the user and the at least one peer, wherein the processor further generates the invitation, the invitation linking to the selected activity; and
transmits the invitation to the at least one peer.

20. A non-transitory computer-readable storage medium having embodied thereon a program, the program being executable by a processor to perform a method for generating a graphical interface, the method comprising:
retrieving stored data regarding a user, a current presence of at least one peer, and historical data of two or more past completed sessions of two or more interactive activities of each of two or more interactive titles completed by and available to the user and the at least one peer;
establishing a session with a user device associated with the user;
constructing a set of interactive activities for the user and the at least one peer based on the historical data of the retrieved data, wherein the constructed set of interactive activities is associated with the current presence of the at least one peer; and
generating a graphical interface that includes user-specific components and peer-specific components based on the constructed set of interactive activities, the generated graphical interface being provided for display on the user device, wherein the interactive activities in the constructed set are launchable from the graphical interface upon selection at the user device.

* * * * *